United States Patent
Beeck

(10) Patent No.: US 6,230,990 B1
(45) Date of Patent: May 15, 2001

(54) INJECTOR FOR FEEDING ADDITIVES IN A POLYMER MELT STREAM

(75) Inventor: Heinz-Dieter Beeck, Frankfurt am Main (DE)

(73) Assignee: Lurgi Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 09/388,493

(22) Filed: Sep. 2, 1999

(30) Foreign Application Priority Data

Nov. 11, 1998 (DE) ................................................ 198 51 948

(51) Int. Cl.$^7$ ................................ B05B 1/26; B05B 7/06; B01F 15/00
(52) U.S. Cl. .................... 239/498; 239/424.5; 366/167.1
(58) Field of Search ..................................... 239/589, 598, 239/424, 434.5; 366/76.1, 167.1, 174.1, 175.2

(56) References Cited

U.S. PATENT DOCUMENTS

| | | | |
|---|---|---|---|
| 3,866,886 | * | 2/1975 | Thorne et al. ..................... 366/174.1 |
| 4,114,195 | * | 9/1978 | Dirksing et al. ................... 366/167.1 |
| 4,753,535 | | 6/1988 | King ..................................... 366/337 |
| 5,176,448 | | 1/1993 | King et al. ........................... 366/167 |
| 5,683,632 | * | 11/1997 | Shimizu et al. .................... 366/76.1 |

FOREIGN PATENT DOCUMENTS

| | | |
|---|---|---|
| 92 225 | 9/1972 | (DE) . |
| 39 30 709 A1 | 1/1990 | (DE) . |
| 0 838 259 A1 | 4/1998 | (EP) . |
| 2 530 967 | 2/1984 | (FR) . |
| WO 94/00226 | 1/1994 | (WO) . |

OTHER PUBLICATIONS

Henglein, *Lexicon Chemische Technik*, VCH (Germany) 1988, with English translation of definition of "Injektor" on p. 267.

* cited by examiner

*Primary Examiner*—Andres Kashnikow
*Assistant Examiner*—Davis Hwu
(74) *Attorney, Agent, or Firm*—McDonnell Boehnen Hulbert & Berghoff

(57) ABSTRACT

The invention comprises an injector for feeding additives into a polymer melt stream. The injector comprises a body with a curved surface and a longitudinal axis having an inlet opening for the additives in the upper portion, opening into a channel running along the longitudinal axis and having a 90 degree deflection to a side injector outlet and having two groove-shaped recesses in the outer wall arranged parallel to the channel on both sides at the level of the injector outlet.

6 Claims, 2 Drawing Sheets

# INJECTOR FOR FEEDING ADDITIVES IN A POLYMER MELT STREAM

BACKGROUND OF THE INVENTION

1. Field of the Invention

This invention concerns an injector for feeding additives into a polymer melt stream.

2. Summary of the Related Art

Devices for feeding one liquid medium into another are known. U.S. Pat. No. 5,176,448 describes a device for mixing fluid media in which a liquid additive is conveyed through a channel having a 90° deflection to an outlet at the side. The side outlet opens directly into the middle of the countercurrent main stream of another liquid medium directly upstream of a biscuit located inside of the main stream conduit and forming an annular gap with it for the passage of the liquids.

U.S. Pat. No. 4,753,535 describes a device for mixing two liquid media, whereby most of the main stream of the one liquid medium is conveyed through a flow channel containing static mixing elements and arranged at the center of the main stream conduit. At a right angle to the direction of flow, the second liquid medium is fed directly into the flow channel through a lateral feed port.

E. Henglein, Lexikon Chemische Technik [Lexicon of Chemical Technology], 1988, page 267, describes an injector for continuous mixing of two gases, where one component of the mixture is fed centrally into a mixing zone at a high rate while the second gas stream enters the zone through the remaining annular gap. Due to the high flow rate and the difference in flow rates at the point of entry, there is a great deal of turbulence prevailing in the mixing zone.

European Patent Application No. 838,259 describes a device for adding additives to a stream of a highly viscous liquid having one feed element for each additive to be supplied. Each feed element has a feed channel for the additive running across the direction of flow that opens into a feed port of an annular tube sheet within the main stream conduit. The tube sheet serves as additive distributor.

SUMMARY OF THE INVENTION

The present invention comprises an injector for feeding of additives primarily into the center of a polymer melt stream and subsequent feeding of the polymer melt stream and additives into a static mixer where the additives and polymer melt are blended. Preferably, it is possible to mount the injector in the polymer melt stream relatively easily.

DETAILED DESCRIPTION OF THE INVENTION

Figure 1A:
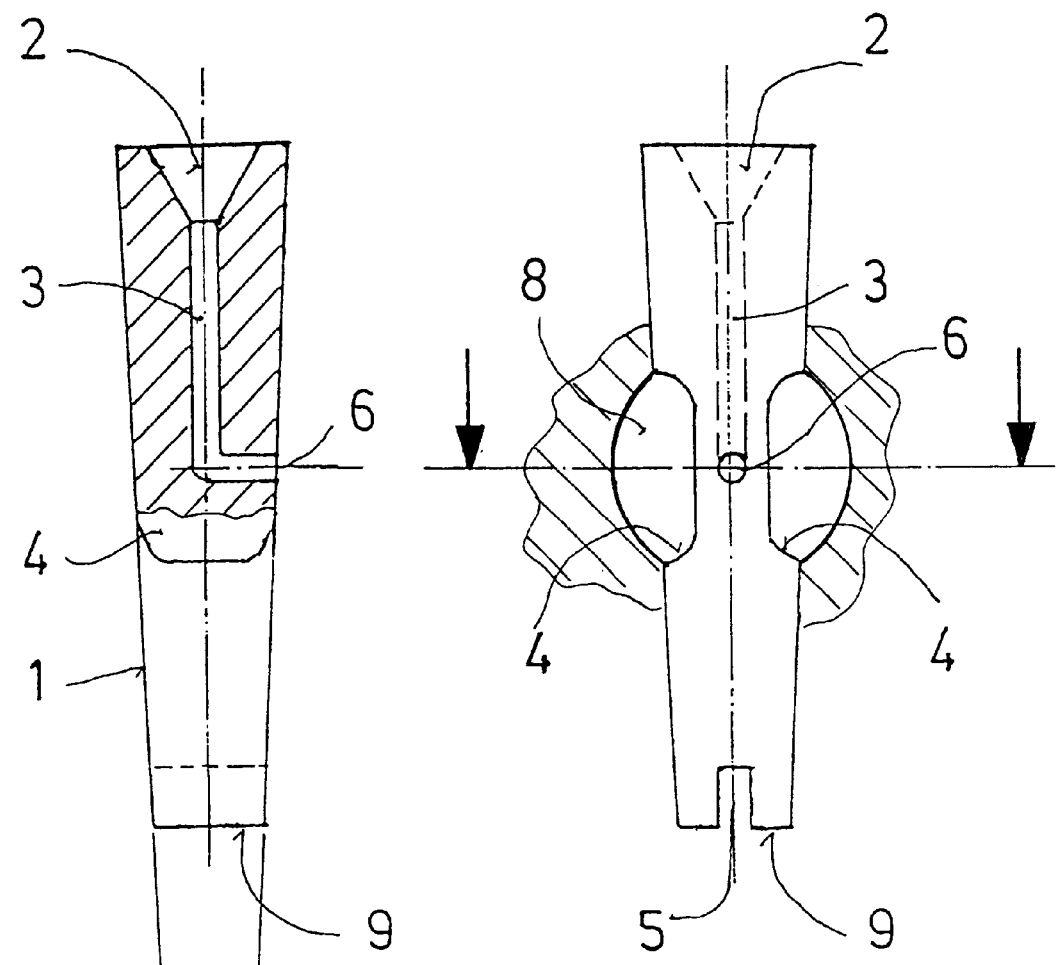
FIGS. 1A and B show the injector according to the invention in longitudinal cross-sectional views from two angles.

The injector according to the invention comprises a body having a curved exterior surface and a longitudinal axis. The body further has an inlet opening for additives in an upper face that opens into a channel running parallel to (preferably along) the longitudinal axis and having a 90° deflection to a side injector outlet. Two groove-shaped recesses are located on the exterior surface at the level of the injector outlet on opposite sides of and running parallel to the plane of the channel.

The term "additives" is understood to include, for example, heat stabilizers and UV stabilizers, lubricants, copolymers or color concentrates.

The injector body may be a straight circular cylinder or a straight circular cylinder cropped at an inclined angle or it may be a straight circular cone or a straight truncated cone. The injector is inserted into the polymer melt stream at a right angle to the direction of flow of the polymer melt stream, with the polymer melt stream flowing along the groove-shaped recesses on either side of the injector body. The size of the groove-shaped recesses should be selected with regard to the diameter of the flow channel of the polymer melt stream so that the edges of the groove-shaped recesses are in flush contact with the flow channel. It has surprisingly been found that by central feeding of additives into the polymer melt stream at the injector outlet the additives remain centered in the polymer melt stream downstream from the injector outlet. Symmetrical flow conditions result and are attributable to the fact that the groove-shaped recesses are arranged on both sides of and parallel to the plane of the injector channel and at the level of the injector outlet. The curved surface exterior of the injector facilitates relatively easy insertion and arrangement of the injector in a form-fitting manner in the flow channel of the polymer melt stream. In addition, the injector outlet can be positioned in the desired manner. Thus, for example, it is possible to arrange the injector outlet in such a way that the additives are fed into the polymer melt stream with or against the direction of flow of the polymer melt stream. With both alternatives, the additives are kept in the middle of the polymer melt stream and thus can be fed centrally to a static mixer, which is a condition for achieving a high degree of homogenity of the resulting mixture.

In a preferred embodiment of the present invention, the cross section of the injector at the level of the injector outlet is droplet-shaped with the injector outlet opening into the narrow, tapered part of the droplet-shaped cross section. This optimizes the flow conditions at the groove-shaped recesses, where the direction of flow of the polymer melt stream is oriented toward the injector outlet, facilitating a central feed of the additives into the polymer melt stream.

Preferably, the inlet opening of the injector is designed in a funnel shape. This measure simplifies the feeding of additives into the injector.

According to another preferred embodiment of this invention, the injector body is a straight truncated cone with the wider end as the upper part having the inlet opening for the additives. Due to the conical shape of the injector, an especially good seal is achieved between the injector and the channel of the polymer melt stream.

In another embodiment of this invention, the injector body has a 5 to 15° cone angle, i.e., a 5 to 15° angle of inclination α between surface segments on opposite sides of the injector body. A surface segment is defined to be a straight line running on the outer surface of the injector body in a plane with the longitudinal axis of the injector body. A cone angle of 5 to 15° yields the optimum sealing of the injector with the polymer melt stream channel. Leakage of the polymer melt would result in harmful damage to the polymer due to degradation products from the leaking polymer, but that is avoided by the aforementioned structure of the injector.

According to another preferred embodiment of this invention, the injector has a groove centrally located in the bottom face. This measure facilitates installation and dismantling of the injector and the correct positioning of the injector outlet.

Figure 1C:
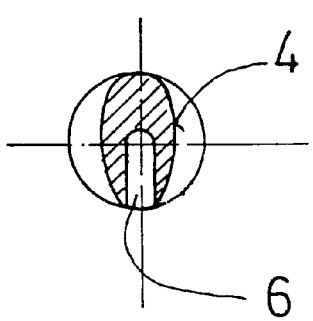
FIG. 1C shows a cross-section through a plane perpendicular to the page intersecting along the line indicated by the arrows in FIG. 1B.

This invention is explained in greater detail below on the basis of the drawings (FIGS. 1 and 2).

FIG. 1 shows the injector (1) for feeding additives into a polymer melt stream, in a sectional view (FIG. 1A) together with the side view (FIG. 1B) and the respective cross section (1C). The injector (1) is in the form of a straight truncated cone with an angle of inclination α (the cone angle) formed between two precisely opposing surface segments on the outside of the injector (1). The angle of inclination α is advantageously in the range between 5° and 15°. An inlet opening (2) for the additives is located on the upper surface of the injector (1) and opens into a channel (3) running in the longitudinal axis of the injector. The channel (3) has a 90° deflection to the side injector outlet (6). In the middle area of the injector (1), groove-shaped recesses (4) are arranged on the outside on both sides parallel with the plane of the channel (3) at the level of the injector outlet (6). The size of the groove-shaped recesses (4) is selected with regard to the diameter of the flow channel (8) of the polymer melt so that the edges of the groove-shaped recesses (4) are in flush contact with the flow channel (8) thereby preventing zones of reduced melt flow. When the injector (1) is installed, the polymer melt stream flows around it symmetrically through the groove-shaped recesses (4). At the level of the injector outlet (6), the cross section of the injector (1) exterior surface forms a droplet shape with the injector outlet (6) opening into the tapered part of the droplet-shaped cross section. Therefore there is central feed of the additives into the polymer melt stream at the injector outlet (6). A groove (5) is arranged on the middle of the bottom face (9) of the injector (1). The groove (5) serves for additional fixation of the injector (1) in the device containing the flow channel (8) for the polymer melt stream.

Figures 2A, 2B:
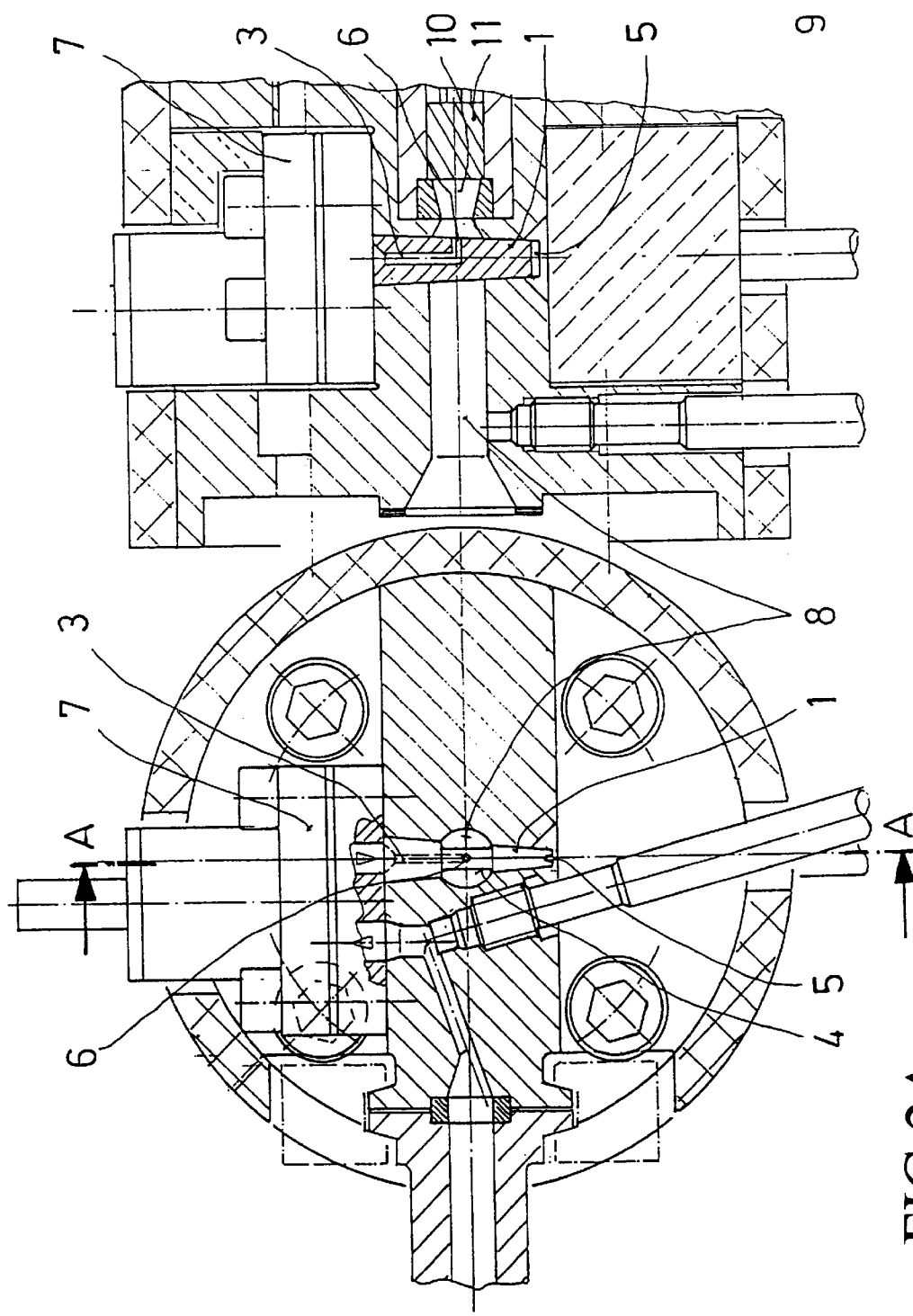
FIGS. 2A and B show two views of the injector in the installed state.
FIG. 2B is a cross-section through a plane perpendicular to the page and along line A—A of FIG. 2A.

FIG. 2 shows the injector (1) for feeding additives into a polymer melt stream in the installed state. Section A—A (FIG. 2B) shows the injector (1) in a cross-sectional view 90° from that in FIG. 2A. Because of the conical shape of the injector (1), which is designed as a straight truncated cone, a tight, form-fitting mounting of the injector (1) is guaranteed. The upper face of the injector (1) together with the inlet opening (2) for the additives advantageously can border on the metering pump (7) for the additives. The pump (7) can thus be positioned relatively closely to the outlet (6) of the injector (1). The polymer melt stream flows directly along the groove-shaped recesses (4) of the injector (1) in the flow channel (8), thus arriving directly at the injector outlet (6), resulting in immediate central feed of additives into the polymer melt stream. The additives fed into the polymer melt stream in this way remain at the center of the polymer melt stream during the remaining conveyance through an acceleration zone (10), which leads directly to the downstream static mixer (11). As shown by section A—A, the injector outlet (6) is positioned so that the additives are fed into the polymer melt stream in the direction of flow of the stream. It is also possible, however, to rotate the injector (1) by 180° so that the additives can be fed into the polymer melt stream against the direction of flow of the stream. Positioning of the injector outlet (6) in the devices having the channel for the polymer melt stream can thus be optimized relatively easily.

I claim:

1. An injector for feeding additives into a polymer melt stream, the injector comprising a body having a longitudinal axis and an inlet opening for the additives in an upper face of the injector, the inlet opening in fluid connection with a channel running parallel to the longitudinal axis and having a 90° deflection that is in fluid connection to the exterior of the injector via a side injector outlet, the injector further comprising two groove-shaped recesses cut into the outer surface of the injector and located on either side of the injector outlet parallel to the channel at outlet.

2. The injector according to claim 1 having a droplet shape in a cross-section perpendicular to the longitudinal axis at the injector outlet, with the injector outlet opening into the pointed, tapered part of the droplet-shaped cross section.

3. The injector according to claim 1, wherein the inlet opening is funnel shaped.

4. The injector according to claim 1, wherein the injector is in the shape of a straight truncated cone.

5. The injector according to claim 4, wherein the cone has a cone angle of between 5 and 15°.

6. The injector according to claim 1 further comprising a lower end face having a central groove.

* * * * *